United States Patent
Gandhewar (10) Patent No.: US 10,805,298 B2
(45) Date of Patent: Oct. 13, 2020

(54) RESULT REPORTING FOR AUTHENTICATION, AUTHORIZATION AND ACCOUNTING PROTOCOLS

(71) Applicant: Juniper Networks, Inc., Sunnyvale, CA (US)

(72) Inventor: Sunil Madhaorao Gandhewar, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 14/975,675

(22) Filed: Dec. 18, 2015

(65) Prior Publication Data

US 2017/0180374 A1 Jun. 22, 2017

(51) Int. Cl.
    *H04L 29/06* (2006.01)
    *H04L 12/24* (2006.01)

(52) U.S. Cl.
    CPC .......... *H04L 63/10* (2013.01); *H04L 41/5012* (2013.01); *H04L 63/0892* (2013.01)

(58) Field of Classification Search
    CPC ............................ H04L 63/10; H04L 63/0892
    USPC .......................................................... 726/21
    See application file for complete search history.

(56) References Cited

U.S. PATENT DOCUMENTS

| | | | | |
|---|---|---|---|---|
| 6,470,453 B1 * | 10/2002 | Vilhuber | ............... | G06F 21/577 709/225 |
| 7,437,457 B1 * | 10/2008 | Eisendrath | .............. | H04L 63/10 709/204 |
| 7,587,751 B2 * | 9/2009 | Potter | ..................... | G06F 21/31 709/225 |
| 7,730,521 B1 * | 6/2010 | Thesayi | ................. | H04L 63/08 370/230 |
| 10,034,168 B1 * | 7/2018 | Reeves | ............... | H04L 63/0892 |
| 2004/0193513 A1 * | 9/2004 | Pruss | ..................... | G06Q 20/28 705/30 |
| 2005/0128946 A1 | 6/2005 | Murakami et al. | | |

(Continued)

FOREIGN PATENT DOCUMENTS

| | | | |
|---|---|---|---|
| CA | 2932708 A1 * | 12/2016 | .......... H04L 63/083 |
| CN | 1627707 A | 6/2005 | |

(Continued)

OTHER PUBLICATIONS

Wessels et al., "Internet Cache Protocol (ICP), version 2," RFC 2186, Network Working Group, IETF, retrieved from https://www.ietf.org/rfc/rfc2186.txt, Sep. 1997, 9 pp.

(Continued)

*Primary Examiner* — Andrew J Steinle
*Assistant Examiner* — Sakinah White Taylor
(74) *Attorney, Agent, or Firm* — Shumaker & Sieffert, P.A.

(57) ABSTRACT

In general, techniques are described for provided result reporting via authentication, authorization and accounting (AAA) protocols. An authorization server comprising a control unit may be configured to perform the techniques. The control unit may authorize a network access server to allow an endpoint device to access one or more services in accordance with a network access protocol. The control unit may also request, in accordance with the network access protocol, a result from the network access server as to whether the one or more authorized services are presently provided for use by the endpoint device.

31 Claims, 5 Drawing Sheets

(56) References Cited

U.S. PATENT DOCUMENTS

| | | | |
|---|---|---|---|
| 2006/0026670 A1* | 2/2006 | Potter | G06F 21/31 |
| | | | 726/7 |
| 2007/0153995 A1* | 7/2007 | Fang | H04M 15/00 |
| | | | 379/114.03 |
| 2008/0076420 A1* | 3/2008 | Khetawat | H04W 8/04 |
| | | | 455/435.1 |
| 2010/0035576 A1* | 2/2010 | Jones | G06Q 30/0251 |
| | | | 455/406 |
| 2010/0058447 A1 | 3/2010 | Wang | |
| 2011/0199906 A1* | 8/2011 | Kanode | H04L 63/0892 |
| | | | 370/235 |
| 2013/0185767 A1* | 7/2013 | Tirupachur Comerica | |
| | | | H04L 9/321 |
| | | | 726/4 |
| 2013/0212387 A1* | 8/2013 | Oberheide | H04L 63/08 |
| | | | 713/168 |
| 2015/0207779 A1* | 7/2015 | Hsu | H04L 63/0892 |
| | | | 726/4 |
| 2017/0111783 A1* | 4/2017 | Zhang | H04W 8/20 |

FOREIGN PATENT DOCUMENTS

| | | |
|---|---|---|
| CN | 102882712 A | 1/2013 |
| EP | 2897336 B1 | 8/2017 |

OTHER PUBLICATIONS

Rigney et al., "Remote Authentication Dial in User Service (Radius)," RFC 2865, Network Working Group, The Internet Society, draft-ietf-radius-radius-v2-05, Jun. 2000, 76 pp.

Rigney et al., "Radius Accounting," RFC 2866, Network Working Group, The Internet Society, draft-ieff-radius-accounting-v2-04.txt, Jun. 2000, 28 pp.

Mitton et al., "Network Access Server Requirements Next Generation (NASREQNG), NAS Model." RFC 2881, Network Working Group, The Internet Society, draft-ietf-nasreq-nasmodel-02, Jul. 2000, 20 pp.

Kumaki, "Interworking Requirements to Support operation of MPLS-TE over GMPLS Networks," RFC 5146, Network Working Group, draft-ietf-ccamp-mpls-gmpls-interwork-reqts-04, IETF Trust, Jan. 13, 2008, 13 pp.

Chiba et al., "Dynamic Authorization Extensions to Remote Authentication Dial in User Service (Radius)," RFC 5176, The Network Working Group, draft-ietf-radext-rfc3576bis-13, IETF Trust, Jan. 2008, 34 pp.

Fajardo, et al., "Diameter Base Protocol," RFC 6733, Network Working Group Internet Draft, draft-ietf-dime-rfc3588bis-34, IETF Trust, Oct. 2012, 152 pp.

Perez-Mendez, et al., "Support of Fragmentation of Radius Packets," RFC 7499, Internet Engineering Task Force, draft-ietf-radext-radius-fragmentation-12, IETF Trust, Apr. 2015, 38 pages.

Extended Search Report from counterpart European Application No. 162038863, dated May 23, 2017, 9 pp.

Response to Extended Search Report dated May 23, 2017, from counterpart European Application No. 16203886.3, filed Dec. 19, 2017, 13 pp.

Examination Report from counterpart European Application No. 16203886.3, dated Aug. 16, 2018, 5 pp.

Response to Examination Report Report dated Aug. 16, 2018, from counterpart European Application No. 16203886.3, filed Dec. 14, 2018, 10 pp.

Examination Report from counterpart European Application No. 16203886.3, dated Apr. 2, 2019, 5 pp.

Response to Extended Search Report dated Apr. 2, 2019, from counterpart European Application No. 16203886.3, filed Aug. 1, 2019, 10 pp.

First Office Action and Search Report, and translation thereof, from counterpart Chinese Application No. 2016111589184, dated Sep. 29, 2019, 14 pp.

Notice of Intent to Grant from counterpart European Application No. 162038863, dated Jan. 31, 2020, 35 pp.

\* cited by examiner

| CODE 302 | IDENTIFIER 304 | LENGTH 306 | AUTHENTICATOR 308 | ATTRIBUTES 310 |

RESULT REPORTING FOR AUTHENTICATION, AUTHORIZATION AND ACCOUNTING PROTOCOLS

TECHNICAL FIELD

The invention relates to computer networks and, in particular, to computer network access control.

BACKGROUND

Generally, entities, such as enterprises and other organizations including service providers, implement network access control in order to control the ability of endpoint devices to communicate on a computer network. To implement network access control, the entity typically employs a network access server, such as a switch, firewall, or broadband network gateway (which also may be referred to as a broadband remote access server), communicatively coupled to an authentication server.

The authentication server may utilize the Remote Authentication Dial In User Service (RADIUS) protocol or any other authentication, authorization, and accounting (AAA) protocol. RADIUS servers are typically used by Internet Service Providers (ISPs), cellular network providers, and corporate and educational networks. The RADIUS protocol carries authentication (authenticate users or devices before allowing them access to a network), authorization (authorize those users or devices for specific network services), and accounting (accounts for and tracks the usage of those services by the users) information between a RADIUS client and a RADIUS server. Information is exchanged between the RADIUS client and the RADIUS server by way of RADIUS messages.

When an endpoint device attempts to access the network for the first time, the network access server (NAS) requires the endpoint device to provide authenticating information. Commonly the authenticating information includes a user-entered password. Upon receiving the password from the endpoint device, the NAS interacts with the authentication server in accordance with an authentication protocol, such as the RADIUS protocol, to determine whether the endpoint device is permitted to access the network.

After the user is authenticated, the NAS may pull services for the user from the authentication server. The NAS may attempt to provision the services for the user. In some instances, the NAS may fail to provision services for the user either after login or later as a result of a dynamic change of authorization (CoA). The user may, in instances where the services are not provisioned, not be able to access services for which the user has paid resulting in a frustrating user experience. When contacted by the user to explain why various of the services are not being provided, the service provider may be unable to readily identify which of the services have been provisioned and why various services were not provisioned.

SUMMARY

In general, techniques are described for enabling a network access device (which may also be referred to as a network access server) to report results/status of the application of services to an authentication server (e.g., a Remote Authentication Dial In User Service (RADIUS) server) or change of authorization (CoA) authority device. The techniques may enable the RADIUS server and/or a CoA authority device (which may also be referred to as an "authorization authority" or "CoA authority") to generate and send an authorization message to the network access server (NAS) requesting that the NAS provide a result of a previous authorization request and/or a status of the services being provided to a particular endpoint device. The NAS may respond to the authorization message with a response message identifying the services being provided to the particular endpoint device.

The techniques may facilitate identification in problems surrounding service provisioning due to, for example, a problem at the NAS. The RADIUS server or CoA authority may, in response to the result response message, perform some form of corrective action. For example, when there is a discrepancy between the services the RADIUS service authorized for the endpoint device and the service currently provided to the endpoint device, the RADIUS server may revoke authorization for the endpoint device to the non-provisioned service, utilize dynamic authorization, log the issue, and/or alert a requesting device (e.g., an accounting server or a network provisioning device) or an endpoint device that a certain service or group of services are not presently provisioned or were previously not provisioned.

In one aspect, a method of operating an authorization server in a network comprises authorizing, by the authorization server, a network access server to allow an endpoint device to access one or more services in accordance with a network access protocol, and requesting, by the authorization server and in accordance with the network access protocol, a result from the network access server as to whether the one or more authorized services are presently provided for use by the endpoint device.

In another aspect, an authorization server comprises a control unit configured to authorize a network access server to allow an endpoint device to access one or more services in accordance with a network access protocol, and request, in accordance with the network access protocol, a result from the network access server as to whether the one or more authorized services are presently provided for use by the endpoint device.

In another aspect, a network access server comprises an interface configured to receive, from an authorization server, authorization to allow an endpoint device to access one or more services in accordance with a network access protocol, and a control unit configured to determine a result of provisioning the one or more authorized services. The interface is further configured to report the determined result to the authorization server in accordance with the network access protocol.

In another aspect, a method of operating a network access server comprises receiving, from an authorization server, authorization to allow an endpoint device to access one or more services in accordance with a network access protocol, determining a result of provisioning the one or more authorized services, and reporting the determined result to the authorization server in accordance with the network access protocol.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
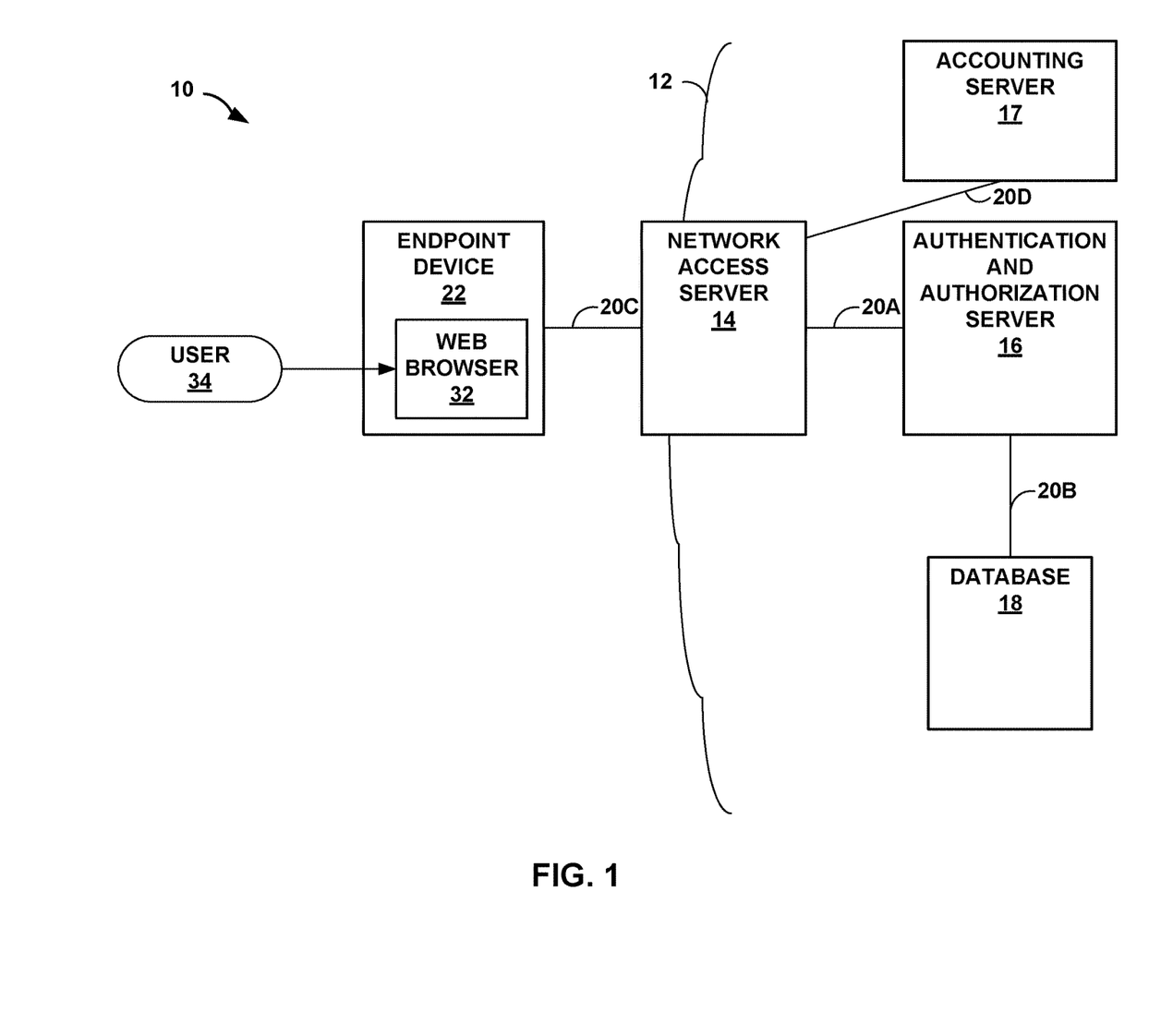
FIG. 1 is a block diagram illustrating an exemplary network system configured to perform various aspects of the result query and reporting techniques described in this disclosure

FIG. 1 is a block diagram illustrating an exemplary network system 10 configured to perform various aspects of the result query and reporting techniques described in this disclosure. Network system 10, as shown in FIG. 1, includes a network 12 at the edge of which is located a network access server 14 (which may also be referred to as a network access device 14) to control access to the network. Internally, an authentication and authorization server 16 is coupled to a database 18 to provide authentication of users and/or endpoint devices. Network access server 14 couples to authentication and authorization server 16 via link 20A, which may generally represent a secure local area network (LAN) associated with an enterprise. Authentication and authorization server 16 is also shown generally as coupled to database 18 via link 20B. Database 18 may, for example, also reside within the secure LAN of the enterprise. Alternatively, database 18 may be stored locally by authentication and authorization server 16. Accounting server 17 couples to network access server 14 via link 20D. Alternatively, accounting server 17 may be implemented on the same device as network access server 14. Network system 10 further includes an endpoint device 22 with which a user 34 interacts to interface with network access server 14 via link 20C.

Network 12 may comprise any type of network capable of transmitting data, such as a layer three (L3) packet-switched network (e.g., the Internet) operating over one or more layer two (L2) networks (e.g., an Ethernet or multi-packet label switching (MPLS) network). Commonly, network 12 comprises an enterprise network or, in other words, a network that an enterprise owns and operates to facilitate intra-enterprise communications. Reference to layers in this disclosure should be construed as reference to layers of the Open Systems Interconnection (OSI) reference model, or OSI model for short.

Because an enterprise maintains network 12 to facilitate intra-enterprise communications, some of which may be sensitive or confidential, network 12 may employ a network access server 14 to control access to network 12 by remote devices located external to network 12, such as endpoint device 22. Network access server 14 controls access to network 12 by denying endpoint device 22 access to network 12 unless and until endpoint device 22 is properly authenticated by network access server 14 operating in conjunction with authentication and authorization server 16. Network access server 14 may, for example, comprise a broadband network gateway (BNG), a broadband remote access server (BRAS), a L2 switch, a firewall, or any other device capable of allowing or denying network access to endpoint device 22 as described herein. More information regarding network access servers may be found in Request for Comments (RFC) 2881, entitled "Network Access Server Requirements Next Generation (NASREQNG) NAS Model," dated July 2000, the entire contents of which are hereby incorporated by references as if set forth in its entirety.

Network 12 further employs authentication and authorization server 16 to facilitate the authentication of devices, such as endpoint device 22. Authentication and authorization server 16 receives and services authentication requests from network access server 14. That is, authentication and authorization server 16 is responsible for authentication of authenticating information provided by endpoint device 22 and returning a result of the authentication to network access device 14. Authentication and authorization server 16 may comprise a remote access dial in user service (RADIUS) or diameter server that operates according to a RADIUS protocol as described in Request for Comments (RFC) 2865, titled "Remote Authentication Dial In User Service (RADIUS)," dated June 2000, Request for Comments (RFC) 6733, titled "Diameter Base Protocol,", dated October 2012, and/or RFC 7499, entitled "Support of Fragmentation of RADIUS Packets," dated April 2015, each of which is incorporated by reference.

Although not shown in FIG. 1, authentication and authorization server 16 may provide authentication services to a plurality of other network access servers similar to network access server 14 by receiving and servicing authentication requests originating from these other network access devices. While described principally in relation to the RADIUS protocol, principles of the disclosure may be utilized with respect to other authentication protocols (e.g. diameter). More information regarding diameter can be found in RFC 5176, entitled "Dynamic Authorization Extensions to Remote Authentication Dial In User Service (RADIUS)," dated January 2008, the entire contents of which are incorporated by reference.

Database 18 comprises a database for storing authentication information, i.e., information and data necessary for servicing authentication requests from network access device 14. Database 18 may also comprise authorization information, e.g., which services are to be provisioned. These services may be sent during Access-Accept and/or CoA request message. Database 18 may be shared between RADIUS and CoA. Alternatively, database 18 may be exclusively utilized by RADIUS or CoA. Database 18 may reside separately from authentication and authorization server 16, as shown in FIG. 1, or may be integrated with or into authentication and authorization server 16 such that authentication and authorization server 16 includes database 18 locally. Database 18 may comprise a flat file database, a structured query language (SQL) database, a Kerberos database, a lightweight directory access protocol (LDAP) database, or an Active Directory database.

Endpoint device 22 may comprise a laptop computer, a desktop computer, a workstation, a personal digital assistant (PDA), a cellular phone, an Internet Protocol (IP) phone (e.g., a phone capable of communicating via a Voice over IP (VoIP) protocol), or any other device capable of accessing network 12. Endpoint device 22 is referred to herein as an "endpoint" because device 22 represents an endpoint with which a user directly interacts. That is, endpoint device 22 includes a web browser 32 or other high-level software application with which a user 34 interacts to access network 12. Web browser 32 may comprise any set of executable software instructions capable of accepting, interpreting, and presenting a graphical display based on hyper-text transfer protocol (HTTP) messages, as well as, possibly a variety of other protocol messages. Example web browsers include a Microsoft Internet Explorer™ web browser, a Netscape™ web browser, an Opera™ web browser, a Firefox™ web browser, and a Safari™ web browser. Although described herein in reference to web browser 32, endpoint device 22 may access network 12 via other applications and/or hardware, such as by way of a file transfer protocol (FTP) terminal, an electronic mail (e-mail) application, and a terminal emulator (e.g., secureCRT).

User 34 may interface with web browser 32 to access a network resource (e.g., video on demand, email, account database stored at accounting server 17, etc.) of network 12 via network access server 14. Endpoint device 22 may, in order to access network 12, send a request to gain access to a particular network resource using access credentials, which typically include a username and password or security certificate provided by user 34. Endpoint device 22 may pass the credentials to network access server 14 via a link-layer protocol, such as a point-to-point protocol (PPP) or via an HTTPS secure web form.

Upon receiving the credentials, network access server 14 may send a RADIUS Access-Request message to authentication and authorization server 16. The RADIUS Access-Request message may request authorization to grant access to the services requested by user 34 via the RADIUS protocol. The Access Request message may include the access credentials as well as other information which network access server 14 may be configured to provide about user 34, such as the network address associated with endpoint device 22, phone number associated with user 34 and/or other information regarding the physical point of attachment to network access server 14.

Authentication and authorization server 16 may receive the Access-Request and verify that the information, including the access credentials, are correct using an authentication scheme, such as a password authentication protocol (PAP), a challenge-handshake authentication protocol (CHAP), or an extensible authentication protocol (EAP). Authentication and authorization server 16 may also verify any other information provided via the Access-Request message, such as the network address, phone number or point of attachment. Authentication and authorization server 16 may further verify the account status associated with user 34 and determine the network services to which user 34 has subscribed. Authentication and authorization server 16 may interface with database 18 to perform the credential verification and determine the network services to which user 34 has subscribed.

In the event authentication and authorization server 16 is unable to verify the access credentials provided by user 34, authentication and authorization server 16 may generate an Access-Reject message indicating that user 34 is denied access to all requested network services. For some users, authentication and authorization server 16 may issue an Access-Challenge message that requests additional information from user 34, where this additional information may include a secondary password, personal identification number (PIN), token or card. In the event authentication and authorization server 16 is able to verify the access credentials provided by user 34, authentication and authorization server 16 may generate an Access-Accept message that grants user 34 access to the requested network services. In this respect, authentication and authorization server 16 may authenticate user 34 and authorize user 34 to access the requested services.

Assuming the access credentials are authenticated, authentication and authorization server 16 sends the Access-Accept message to network access server 14. The Access-Accept message may include authorization attributes (in the form of attribute value pairs, which may be denoted as "AVPs") stipulating terms of access to be granted. For example, the authorization attributes may include a specific Internet protocol (IP) address to be assigned to the user, an address pool from which the user's IP address should be chosen, a maximum length of time that user 34 may remain connected, services to which user 34 has subscribed and various other connection parameters, such as layer 2 tunneling protocol (L2TP) parameters, virtual local area network (VLAN) parameters, and quality of service (QoS) parameters.

Network access server 14 may receive the Access-Accept message, provision the authorized services for use by user 34 listed in the Access-Accept message, and provide policy enforcement during the use of the services in accordance with the attributes set forth in the Access-Accept message. Once the services are provisioned or otherwise provided for use by user 34, user 34 may direct endpoint device 22 to access the authorized services (e.g., via web browser 32).

After authenticating the access credentials, authentication and authorization server 16 may dynamically update or change the services provided to user 34. The above noted RFC 5176 provides for dynamic authorization post-login time that pushes a Change of Authorization (CoA) to already logged-in users (which is another way of referring to users for which access credentials have been authenticated) via a CoA-Request message from authentication and authorization server 16 to network access server 14 and a CoA-Acknowledgement (CoA-ACK) message from network access server 14 to authentication and authorization server 16.

In the context of RFC 5176, authentication and authorization server 16 may operate as the dynamic authorization client (DAC) (which may also be referred to as a "CoA authority") and as the RADIUS server. Although described as operating as both CoA authority and the RADIUS server, authentication and authorization server 16 may only act as the RADIUS server or as the CoA authority and not both. As noted in RFC 5176, the DAC does not necessarily have to be co-resident with the RADIUS authentication or accounting server and may be separate from the RADIUS authentication and/or accounting server. To the extent authentication and authorization server 16 is shown and described as being both the CoA authority and the RADIUS server, such illustrations and descriptions is for ease of illustration purposes only.

In this respect, RFC 2186 provides for a pull mechanism by which network access server 14 retrieves or pulls the services during user authentication from authentication and authorization server 16. RFC 5176 however provides for a push mechanism by which authentication and authorization server 16 dynamically provides or, in other words, pushes services from authentication and authorization server 16 to network access server 14 after the user has been authenticated.

RFC 7499 provides an additional layer to the RADIUS protocol that allows for packet fragmentation. The RADIUS protocol as set forth in RFCs 2186 and 5176 may only support packet sizes up to 4096 bytes. RFC 7499 provides for fragmentation of large RADIUS packets during login time (meaning, when the access credentials from user 34 are authenticated). Fragmentation according to RFC 7499 may therefore utilize the pull mechanism. RFC 7499 may accommodate dynamic CoA by converting from the push mechanism of RFC 5176 to the pull mechanism using a CoA-Request message that includes a Service-Type of Authorize Only. The Authorize Only Service-Type may indicate that the session for user 34 needs to be re-authorized, thereby requiring user 34 to re-enter the access credential (or endpoint device 22 when re-authorization is automated) and issue an Access-Request message in accordance with RFC 2186. Authentication and authorization server 16 may perform fragmentation after converting to the pull mechanism and fragment the Access-Accept message when the size exceeds 4096 bytes.

In this way, network access server 14 and authentication and authorization server 16 may facilitate the delivery of services for which user 34 is authorized to access. Authentication and authorization server 16 may represent a device configured to authorize network access server 14 to allow endpoint device 22 to access one or more services in accordance with a network access protocol (e.g., the RADIUS protocol). Network access server 14 may represent a device configured to provide (or, in other words, provision), in response to the authorization, the one or more services for use by endpoint device 22.

During delivery of the services, network access server 14 may communicate with accounting server 17 and report service usage and other accounting information to accounting server 17. Network access server 14 may report START, STOP, and/or interim accounting information to accounting server 17 depending on the configuration of network access server 14 and/or accounting server 17. A START value reported for any given service may indicate that the service has been successfully provisioned, while a STOP value reported for any given service may indicate that the service is deactivated. More information concerning accounting as provided in accordance with the RADIUS protocol can be found in RFC 2866, entitled "RADIUS Accounting," dated June 2000, the entire contents of which is hereby incorporated by reference.

Although network access server 14 may report accounting information regarding the delivery of services to accounting server 17, network access server 14 generally does not report the status of the services provisioned for a particular user 34 back to authentication and authorization server 16 when employing the pull mechanism. In other words, authentication and authorization server 16 generally is not aware of which services have been provisioned when the pull mechanism of RFCs 2865 or 7499 is employed. RFC 5176 provides for a general acknowledgement of services by network access server 14. That is, authentication and authorization server 16 may indicate in a CoA-request that one or more services be updated, added or removed. Network access server 14 may respond with a CoA-ACK indicating that all of the services were updated, added or removed or with a CoA-negative acknowledgement (CoA-NAK) indicating that one or more of the services were not updated, added or removed.

As a result of the general lack of status reporting for the pull mechanism, some service providers have resorted to provisioning the services for their users via the pull mechanism and then, nearly immediately after provisioning the services, performing the CoA to re-provision the services in accordance with the push mechanism of RFC 5176 so as to receive the CoA-ACK indicating that all of the services have been generally provisioned. However, given the growth in the number of services (and the resulting increased sizes of the Access-Accept messages), the service providers may be unable to rely on the push mechanism for the overall status given that packet fragmentation is not currently allowed for the push mechanism of RFC 5176.

Moreover, the push mechanism may not be as readily available to those service providers that do not have co-located authentication servers and CoA authorities. In other words, the configuration for the push mechanism may be complicated when the CoA authority is not co-located with the authentication server. In this context, the CoA authority may need to fetch the services from the authentication database and provide the CoA from the CoA authority to network access server 14.

In this respect, there are two ways by which to gather service status. One involves accounting messages, which service providers may not be interested in collecting or configuring (especially as service providers move away from toll-based subscriptions). Moreover, when the accounting server 17 is separate from the authentication server, accounting information regarding service status may not be readily available to the network administrators responsible for provisioning the services (e.g., due to network access restrictions that prevent non-accounting employees from viewing accounting information). Furthermore, depending on the configuration, services may be attached at a different level than the accounting (e.g., accounting may be enabled at the underlying PPP interface, while services may be attached at the dynamic host configuration protocol (DHCP) subscriber), which may further make accounting information difficult to obtain and/or inaccurate with regard to individual service provisioning status.

The other way involves the CoA push mechanism that provides for a general acknowledgement of services, but which does not allow for packet fragmentation and may be cumbersome to implement for network architectures that do not have co-located CoA authorities and authentication servers. Moreover, when the CoA push mechanism is dynamically employed, network access server 14 may not send accounting messages indicating the start and stop of services.

In accordance with the techniques described in this disclosure, authorization server 16 may request, in accordance with the RADIUS protocol, a result from network access server 14 as to whether the one or more authorized services are presently provided for use by endpoint device 22. Authorization server 16 may request the result during login of user 34 or after login of user 34. During login of user 34, authorization server 16 may generate an Access-Accept message as outlined above. The Access-Accept message may however also include a "Result" message attribute that authorization server 16 may specify along with a value of "Result-Request."

Network access server 14 may receive the Access-Accept message from authentication and authorization server 16 and determine the result of provisioning each of the one or more authorized services. The Access-Accept message may, as described in more detail below, identify each of the services for which the result is requested (e.g., by a service set identifier). Network access server 14 may determine the result of provisioning each of the identified services and generate an Access-Request message that includes the status as a message attribute with a value set to "Result-Success" or "Result-Failed" depending on whether all of the services were successfully provisioned ("Result-Success") or whether any one of the services were not successfully provisioned ("Result-Failed") for use by endpoint device 22.

In this way, network access server 14 may report the determined result to authorization server 16 in accordance with the RADIUS protocol.

In this respect, the techniques may facilitate identification in problems surrounding service provisioning due to, for example, a problem at network access server 14. The authentication and authorization server 16 may, in response to the Access-Request message (which may more generally be referred to as a "result message" or a "result response message"), perform some form of corrective action. For example, when there is a discrepancy between the services that authentication and authorization server 16 authorized for endpoint device 22 and the service currently provided to endpoint device 22 by network access device 14, authentication and authorization server 16 may revoke authorization for endpoint device 22 to the non-provisioned service, utilize dynamic authorization, log the issue, and/or alert a requesting device (e.g., a network management device or a network provisioning device, which is not shown for ease of illustration purposes) or endpoint device 22 that a certain service or group of services are not presently provisioned or were previously not provisioned.

Figure 2:
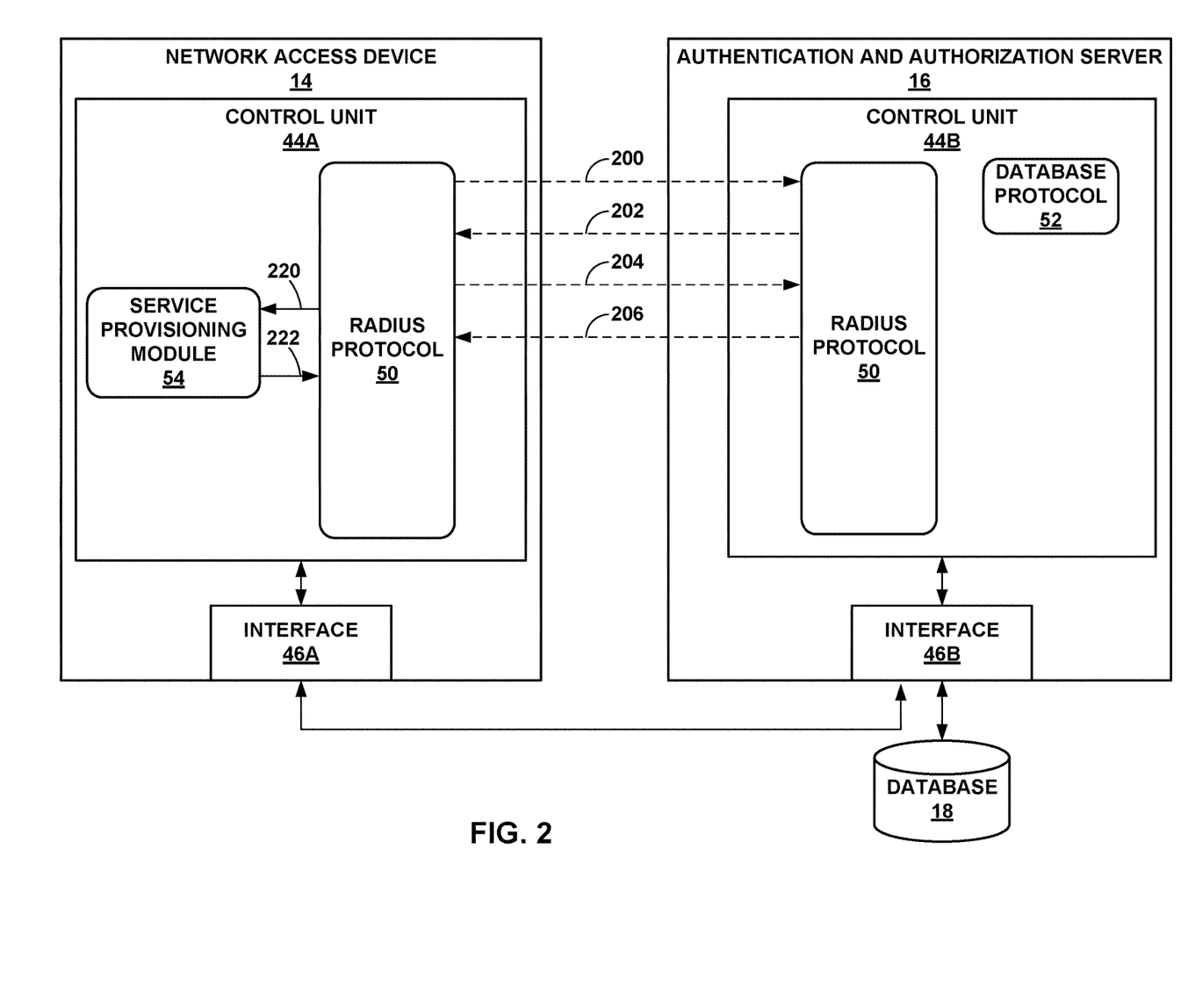
FIG. 2 is a block diagram illustrating an example interaction between the network access server and the authentication server of FIG. 1 in more detail.

FIG. 2 is a block diagram illustrating an example interaction between network access server 14 and authentication and authorization server 16 of FIG. 1 in more detail. As shown in FIG. 2, network access device 14 and authentication and authorization server 16 both include respective control units 44A, 44B ("control units 44") and interfaces 46A and 46B.

Each of control unit 44 may represent hardware or a combination of hardware and software. Control units 44 may each include, as one example, one or more processors and one or more memories. The memories may represent non-transitory computer-readable storage mediums to which instructions or other commands are stored. The instructions may, when executed by the one or more processors, cause the one or more processors to perform various aspects of the techniques described in this disclosure. As another example, the control units 44 may each represent fixed hardware logic capable of performing the techniques described in this disclosure. Control unit 44 may, as noted in detail below, represent a wide variety of devices or apparatuses. Interfaces 46A and 46B may each represent an interface card, network interface card or other type of interface by which messages may be sent via a network either wirelessly or wired.

Each of control units 44 includes a RADIUS protocol module 50 ("RADIUS protocol 50"). Control unit 44B of authentication and authorization server 16 further includes a database protocol module 52 ("database protocol 52"). RADIUS protocol modules 50 represent an exemplary instance of an authentication, authorization, and accounting (AAA) protocol or, more generally, an authentication protocol. RADIUS protocol 50 enables AAA transactions by which network access device 14 may authenticate and authorize an endpoint device, such as endpoint device 22 of FIG. 1. Because authentication and authorization server 16 includes and operates in accordance with RADIUS protocol 50, authentication and authorization server 16 may be referred to as a "RADIUS server." Database protocol 52 generally represents a module for communicating with database 18 and may implement SQL or other database languages for formulating requests to retrieve information stored to database 18.

As noted above, network access device 14 may receive a request to access a service from endpoint device 22. The request may include access credentials. In response to this request, control unit 44A of network access device 14 may invoke RADIUS protocol module 50. RADIUS protocol module 50 of control unit 44A may generate an Access-Request message 200 that requests access to the service on behalf of endpoint device 22 and providing the access credentials to facilitate authentication. RADIUS protocol module 50 may transmit Access-Request message 200 via interface 46A to authentication and authorization server 16. Authentication and authorization server 16 may receive the Access-Request message 200 via interface 46B. Control unit 44B of authentication device 16 may invoke RADIUS protocol module 50 in response to receiving Access-Request message 200. RADIUS protocol module 50 of control unit 44B may process Access-Request message 200, authenticating user 34 based on the provided access credentials through interactions with database 18 via database protocol module 52.

Assuming user 34 is successfully authenticated, RADIUS protocol module 50 of control unit 44B may retrieve the one or more services for which user 34 is to be provided. RADIUS protocol module 50 may generate Access-Accept message 202 to include the one or more services for which user 34 is to be provided. RADIUS protocol module 50 may also include a "Result" message attribute having a value of "Result-Request" to request a result from network access server 14 as to whether the one or more authorized services are presently provided for use by the endpoint device. RADIUS protocol module 50 of control unit 44B may then transmit Access-Accept message 202 to RADIUS protocol module 50 of control unit 44A via interface 46B.

RADIUS protocol module 50 of control unit 44A may receive Access-Accept message 202. RADIUS protocol module 50 may process Access-Accept message 202 to extract authorized services 220 and provide the one or more authorized services 220 to service provisioning module 54. Control unit 44A may include service provisioning module 54, which may represent a module configured to provision one or more authorized services, such as authorized services 220.

Service provisioning module 54 may provision authorized services 220 and indicate to RADIUS protocol module 50 that the services have been provisioned. RADIUS protocol module 50 may next, due to the result request specified in the Access-Accept message, query service provisioning module 54 as to the result of provisioning authorized services 220. Service provisioning module 54 may then reply by reporting the result for each of the queried authorized services (i.e., authorized services 220 in this example). Service provisioning module 54 may reply to the query with results 222. RADIUS protocol module 50 of control unit 46A may receive results 222 and generate a result message in the form of an Access-Request message 204 that includes a "Result" message attribute having a value of "Result-Success" or "Result-Failed" based on results 222. When results 222 indicate that all of the services 220 were successfully provisioned, the request message 204 includes a "Result" message with a value of "Result-Success." When results 222 indicate that any one of the services 220 were not successfully provisioned, the request message 204 includes a "Result" message with a value of "Result-Failed." RADIUS protocol module 50 of control unit 44A transmits the Access-Request message 204 via interface 46A to RADIUS protocol module 50 of control unit 44B.

RADIUS protocol module 50 of control unit 44B may receive Access-Request message 204 and process message 204 to identify whether authorized services 220 were successfully provisioned. RADIUS protocol module 50 of control unit 44B may operate in any of the above noted ways based on whether the authorized services 220 were successfully provisioned. RADIUS protocol module 50 may respond to Access-Request message 204 with a confirmation message in the form of an Access-Accept message 206 that includes a "Result" message attribute having a value of "Result-Received."

Figure 3:
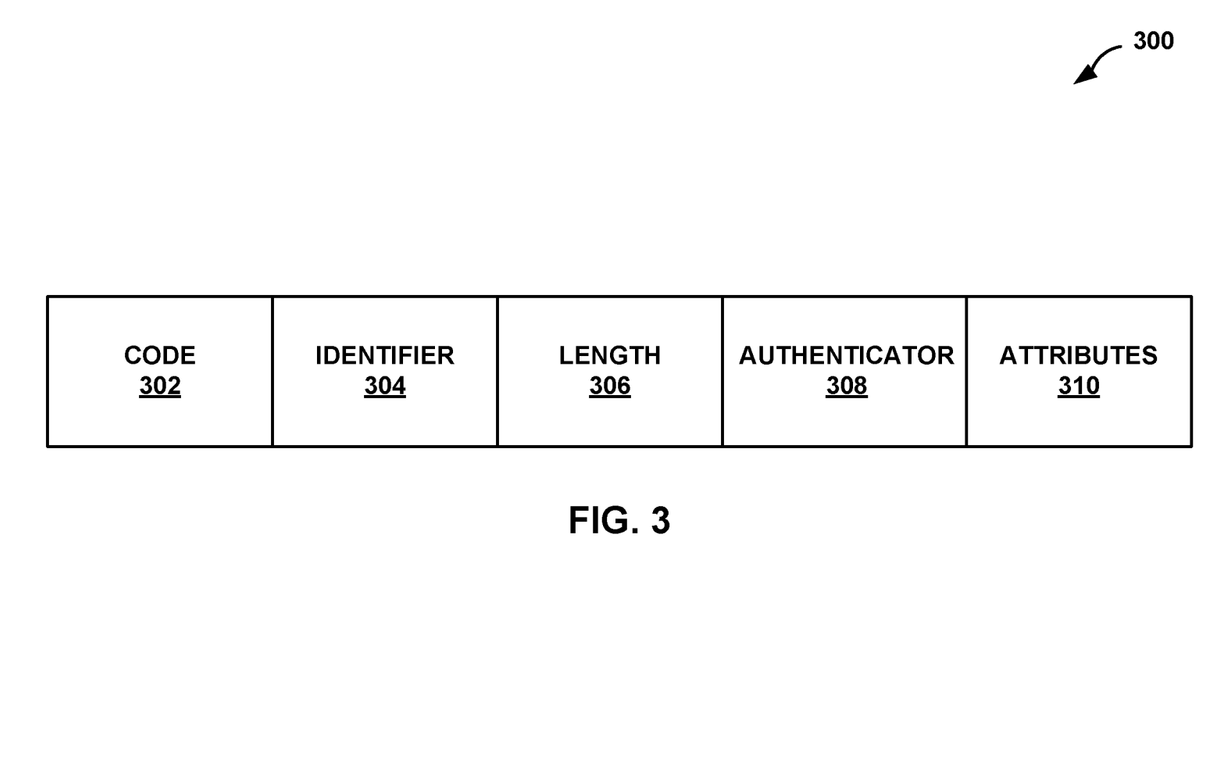
FIG. 3 is a diagram illustrating a format of an example message used to query and report results of service provisioning in accordance with various aspects of the techniques described in this disclosure.

FIG. 3 is a diagram illustrating a format of an example message 300 used to query and report results of service provisioning in accordance with various aspects of the techniques described in this disclosure. Message 300 may include a code field 302, an identifier field 304, a length field 306, an authenticator field 308, and an attributes field 310. Message 300 may be encapsulated inside the data field of a user datagram protocol (UDP) packet. Although described with respect to UDP, message 300 may be encapsulated into the data field of a transmission control protocol (TCP) packet or any other type of packet.

Code field 302 is one octet, and identifies the type of RADIUS packet. When a packet is received with an invalid Code field 302, the packet may be silently discarded. Frequently used packet type codes include: Access-Request (1), Access-Accept (2), Access-Reject (3), CoA-Request (43), CoA-ACK (44), and CoA-NAK (45).

RFC 2865, titled "Remote Authentication Dial In User Service (RADIUS)," prepared by the Network Working Group of the Internet Engineering Task Force (IETF), dated June 2000 describes a pull mechanism where a network access server (NAS), incorporated by reference herein, pulls the services for a user at login time, from the RADIUS server. RFC 2865 discusses the use of an Access-Request message from the NAS to pull services for a user at login time and an Access-Accept message from the RADIUS server to provide the services listing.

Identifier field 304 may include one octet, and may aid in matching requests and replies. Authentication and authorization server 16 may be configured to detect a duplicate request when the request has the same source IP address, source UDP port, and identifier 304 within a short span of time. Duplicate packets may occur due to a retransmission of the packet when the sender of message 300 does not receive a response. Identifier field 304 may be changed whenever the content of attributes field 310 changes, or whenever a valid reply has been received for a previous request. For retransmissions where the contents are identical, the identifier 304 may remain unchanged.

Length field 306 may include two octets. Length field 306 may indicate the length of message 300 including code field 302, identifier field 304, length field 306, authenticator field 308, and attribute fields 310. Octets outside the range of length field 306 may be treated as padding and ignored on reception. When packet 300 is shorter than length field 306 indicates, message 300 may be discarded. In an example using the RADIUS protocol, the minimum length is 20 bytes and maximum length is 4096 bytes.

Authenticator field 308 may include sixteen (16) octets. The most significant octet may be transmitted first. The value stored to authenticator field 308 may be used to authenticate packets between the client and server.

Attribute field 310 may be variable in length, and contain a list of zero or more Attributes. Attributes usable for result reporting include attributes related to NAS identification, session identification, service type, proxy state, error messages, state messages, packet fragmentation, and result information.

NAS identification attributes may include:
NAS-IP-Address—a 4 octet attribute listing the IPv4 address of the NAS 14;
NAS-Identifier—a 32 octet string identifying the NAS 14; and
NAS-IPv6-Address—a 95 octet attribute listing the IPv6 address of the NAS 14.

Session identification attributes may include:
User-Name—a 1 octet attribute listing the name of the user associated with one or more sessions;
NAS-Port—a 5 octet attribute listing the port on which a session is terminated.
Framed-IP-Address—an 8 octet attribute listing the IPv4 address associated with a session;
Vendor-Specific—a 26 octet attribute listing one or more vendor-specific identification attributes;
Called-Station-Id—a 30 octet attribute listing the link address to which a session is connected;
Calling-Station-Id—a 31 octet attribute listing the link address from which one or more sessions are connected;
Acct-Session-Id—a 44 octet attribute listing the identifier uniquely identifying a session on the NAS;
Acct-Multi-Session-Id—a 50 octet attribute listing the identifier uniquely identifying related sessions;
NAS-Port-Id—an 87 octet attribute listing a string identifying the port where a session is;
Chargeable-User-Identity—an 89 octet attribute listing the chargeable user identity (CUI) associated with one or more sessions;
This attribute may be used where a privacy Network Access Identifier (NAI) is used, because in this case the User-Name (e.g., "anonymous") may not identify sessions belonging to a given user;
Framed-Interface-Id—a 96 octet attribute listing the IPv6 Interface Identifier associated with a session, may be sent with Framed-IPv6-Prefix; and
Framed-IPv6-Prefix—a 97 octet attribute listing the IPv6 prefix associated with a session, which may be sent with the Framed-Interface-Id attribute.

Authentication and authorization server 16 may request to have a status or result of a previously provided listing of services for a particular user after, for example, a user logs in (or obtains authorization) initially or through a CoA request after an initial authorization. The Result attributes: Result-Request, Result-Success, Result-Failed, and Result-Received may be used. In other words, authentication and authorization server 16 may specify a new attribute in attribute field 310. The new attribute (which may also be referred to as a message attribute) may be defined as a new attribute value pair (AVP) and may be referred to as a "Result attribute" or "Result AVP."

For example, authentication and authorization server 16 may utilize the Result attribute with the Result-Request value (within e.g. an Access-Accept message) to query network access server as to whether previously (or contemporaneously) provided services listed as being authorized for use by a particular user is being provided to that user. Network access server 14 may utilize the Result attribute with the Result-Success or Result-Failed values (within e.g. an Access-Request message) to report whether authorized services 220 were successfully provisioned to authentication and authorization server 16 that all authorized services are being provided to the user or that at least one authorized service is not being provided to the user, respectively. In response, authentication and authorization server 16 may confirm the Result-Success or Result-Failed with the Result attribute having a value of Result-Received. In each instance, the Result attribute is defined in attributes field 310 of message 300.

When network access server 14 finds the proposed attribute Result-Request, network access server 14 may initiate another Access-Request with Service-Type being the same as initial Access-Request (e.g. Login, at login, or Authorize-Only, for CoA) and may include proposed attribute Result with value as either Result-Success or Result-Failed. Network access server 14 may then include Error-Cause attribute with the cause of the error, when the value of the Result attribute is Result-Failed.

Network access server 14 may also include a listing of the services that have failed in the Access-Request packet with the Result-Failed attribute. Network access server 14 may specify the listing of services that have failed as part of a Vendor Specific Attribute (VSA). Because RADIUS is a step-lock protocol, authentication and authorization server 16 may send the final Access-Accept message with the same Service-Type and include proposed Result attribute with value Result-Received. In this respect, the techniques may help RADIUS (and other AAA protocols or network access protocols) to get the status of any Service-Type for which NAS had sent the request, rather than relying on accounting messages.

Figure 4:
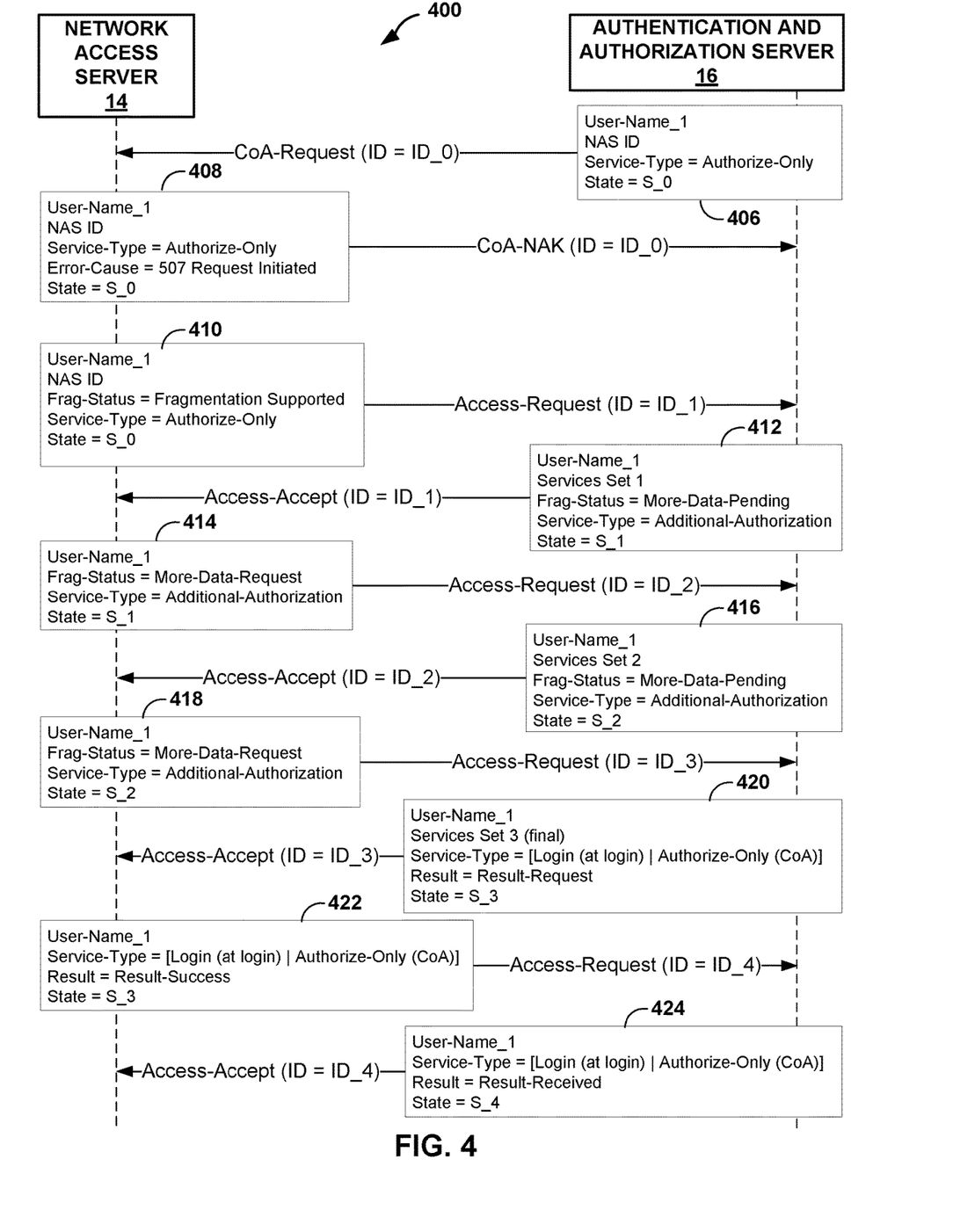
FIG. 4 is a diagram illustrating an example interaction between the network access device and the authentication server of FIG. 1 in converting from a push mechanism for providing service authorization to a pull mechanism for receiving service authorization so as to perform result querying in accordance with various aspects of the technique described in this disclosure.

FIG. 4 is a diagram illustrating an example interaction between network access device 14 and authentication and authorization server 16 of FIG. 1 in converting from a push mechanism for providing service authorization to a pull mechanism for receiving service authorization so as to perform result querying in accordance with various aspects of the technique described in this disclosure. When authentication and authorization server 16 wants to query service provisioning results but is operating with respect to the push mechanism in accordance with RFC 5176 with regard to service provisioning, authentication and authorization server 16 may initiate a conversion from the push mechanism to the pull mechanism. Authentication and authorization server 16 may perform this conversion so that message fragmentation may occur, which is only available in the pull mechanism per RFC 7499. In this example, it is assumed for ease of illustration purposes that user 34 is identified by "User-Name_1" and that network access server 14 is identified by "NAS ID."

As shown in the example of FIG. 4, authentication and authorization server 16 transmits a CoA-Request message 406 (with identifier ID_0) to network access server 14. Request message 406 includes a user name (User-Name_1), a NAS ID, a Service-Type (Authorize-Only), and a state (S_0). Message 406 may be sent by authentication and authorization server 16 (acting as the CoA Authority given that authentication and authorization server 16 operates as both the RADIUS server and the CoA authority) to change the attributes of an authentication, authorization, and accounting (AAA) session after the session has been authenticated or to obtain the results of a previous authentication/login by user 34 or endpoint device 22. Authentication and authorization server 16 may send CoA request 406 in response to a subscription change from endpoint device 22.

Authentication and authorization server 16 may send this CoA request 406 to initiate the conversion from the push mechanism described in RFC 5176 to the pull mechanism described in RFCs 2865 and 7499. Authentication and authorization server 16 may initiate the conversion by specifying a Service-Type attribute with a value of "Authorize-Only." The "Authorize-Only" Service-Type attribute value may indicate to network access server 14 that the corresponding AAA session has to be re-authorized, requiring user 34 (or endpoint device 22 when authentication is automated) to re-enter the access credentials.

In response, network access server 14 sends a negative-acknowledgment message denoted "CoA-NAK 408" (with identifier ID_0) to authentication and authorization server 16. The CoA-NAK message 408 includes a user name (User-Name_1), a NAS ID, a Service-Type (Authorize-Only), an error message (507: Request Initiated) and a state (S_0). While in the form of a CoA-NAK message, the use of this message type may indicate that the CoA-Request 406 is being initiated based on the "Authorize-Only" service type and an Access-Request message 410 will follow, effectively converting from the push mechanism to the pull mechanism in which packet fragmentation is permitted.

Network access server 14 may transmit an Access-Request message 410 (with identifier ID_1). Message 410 may include a user name (User-Name_1), a NAS ID, a fragmentation status (Fragmentation-Supported), a Service-Type (Authorize-Only), and a state (S_0). The fragmentation status value of "Fragmentation-Supported" alerts authentication and authorization server 16 that network access server 14 supports packet fragmentation.

Authentication and authorization server 16 may transmit an Access-Accept message 412 (with identifier ID_1) to network access server 14. The message may include a user name (User-Name_1), a services set (Services Set_1), a fragmentation status (More-Data-Pending), a Service-Type (Additional-Authorization), and a state (S_1). This is the first of three messages 412, 416, and 420 that includes a listing of the authorized services of the user. Services Set 1 may include attributes of the authorized services. The fragmentation status value "More-Data-Pending" may inform network access server 14 that there are additional packets to fully respond to Access-Request message 410.

In response, network access server 14 may request the additional data as indicated in the fragmentation status of the Access-Accept message 412 (with identifier ID_2) from authentication and authorization server 16. Network access server 14 may request the additional data by generating and transmitting an Access-Request message 414, which may include a user name (User-Name_1), a fragmentation status (More-Data-Request), a Service-Type (Additional-Authorization), and a state (S_1). While the fragmentation status of the Access-Accept message 412 continues to indicate "More-Data-Pending," network access server 14 will continue to request more data from authentication and authorization server 16.

In response to receiving Access-Request message 414, authentication and authorization server 16 may send Access-Accept message 416 (with identifier ID_2) to network access server 14. Message 416 may include a user name (User-Name_1), a services set (Services Set 2), a fragmentation status (More-Data-Pending) indicating more data is still pending, a Service-Type (Additional-Authorization), and a state (S_2).

In response to receiving Access-Accept message 416, network access server 14 may request the additional data as indicated in the fragmentation status of the Access-Accept message 416 (with identifier ID_3) from authentication and authorization server 16. Access-Request message 418 may include a user name (User-Name_1), a fragmentation status (More-Data-Request), a Service-Type (Additional-Authorization), and a state (S_2).

In response to receiving Access-Request message 418, authentication and authorization server 16 may send an Access-Accept message 420 (with identifier ID_3) to network access server 14. Access-Accept message 420 may include a user name (User-Name_1), a services set indicating this is the final service set (Services Set 3 (final)), a Service-Type (e.g. Login (for example, at login) or Authorize-Only (for example, with a CoA), a result attribute (Result-Request), and a state (S_3).

In response to the "Result" attribute having a value of "Result-Request," network access server 14 may determine whether each of the authorized services in the listing of one or more authorized services (from messages 412, 416, and 420) is currently being provisioned for use by user 34 via endpoint device 22. Alternatively, message 420 may include a services set without including a status (or result) identifier.

Network access server 14 may send an Access-Request message 422 (with identifier ID_4) to authentication and authorization server 16. The message 422 may include a user name (User-Name_1), a Service-Type (e.g. Login (for example, at login) or Authorize-Only (for example, with a CoA)), a status (Result-Success) and a state (S_3). The status of Result-Success (in message 422) informs authentication server 404 that each of the services authorized for use by user 34 are available for use by user 34 or, in other words, are currently being provisioned for use by user 34.

In response to Access-Request message 422, authentication and authorization server 16 may send an Access-Accept message 424 (with identifier ID_4) to network access server 14. Access-Accept message 424 may include a user name (User-Name_1), a Service-Type (e.g. Login (for example, at login) or Authorize-Only (for example, with a CoA)), a Result (Result-Received) and a state (S_4). The Result attribute having a value of "Result-Received" indicates that authentication and authorization server 16 has received the previously sent Access-Request message 422 with the "Result" attribute having a value of "Result-Success."

In an alternative example, one or more authorized services authorized to the user are not available or provisioned to the user. In this alternative example, network access server 14 may respond to Access-Accept message 420 with an Access-Request message including the value of "Result-Failed" for the "Result" attribute. In response to this Access-Request message, authentication and authorization server 16 may de-authorize the user, go to dynamic authorization, and/or inform a different device, such as a network management device, that the service is not applied. Any one or more of these operations may be performed and any communications to perform these remedial operations may also include the attributes of the non-provisioned, but authorized, service(s). Upon reception of the "Result-Failed" message, authentication and authorization server 16 may likewise respond with message 424 alerting network access server 14 that the status was received.

Figure 5:
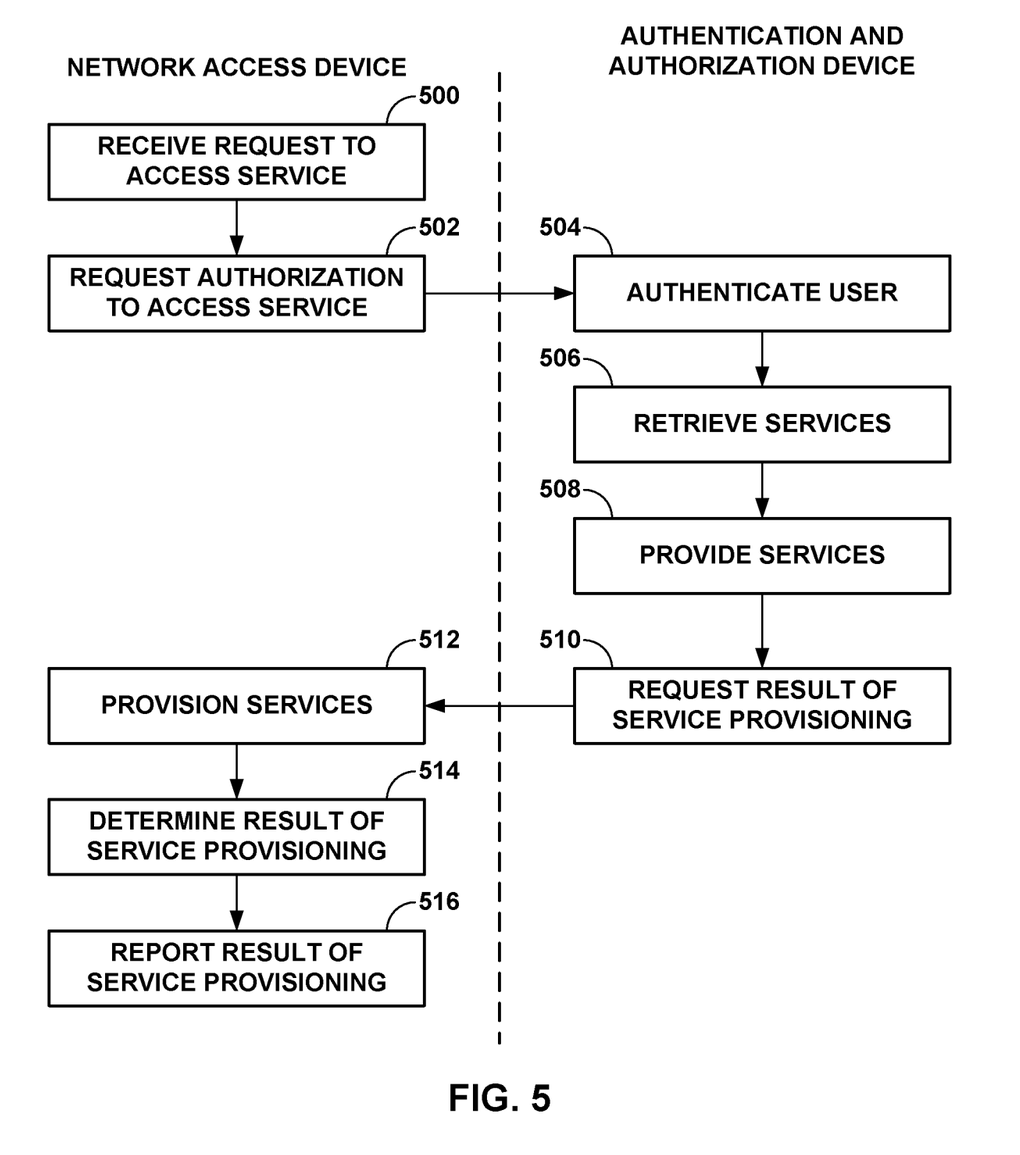
FIG. 5 is a flowchart illustrating exemplary operation of a network access device and an authorization device in performing various aspects of the result query and reporting techniques described in this disclosure.

FIG. 5 is a flowchart illustrating exemplary operation of a network access device and an authorization device in performing various aspects of the result query and reporting techniques described in this disclosure. Network access server 14 of FIG. 1 may represent one example of a network access device. Authentication and authorization server 16 of FIG. 1. may represent one example of an authorization device or authorization server.

As noted above, network access server 14 may receive a request to access a service from endpoint device 22 (500). The request may include access credentials. In response to this request, control unit 44A of network access server 14 may invoke RADIUS protocol module 50. RADIUS protocol module 50 of control unit 44A may generate an Access-Request message 200 that requests access to the service on behalf of endpoint device 22 and providing the access credentials to facilitate authentication. In other words, request message 200 may represent a request for authorization to access the requested service. RADIUS protocol module 50 may transmit Access-Request message 200 via interface 46A to authentication and authorization server 16, thereby effectively requesting authorization for user 34 to access service (502).

Authentication and authorization server 16 may receive the Access-Request message 200 via interface 46B. Control unit 44B of authentication device 16 may invoke RADIUS protocol module 50 in response to receiving Access-Request message 200. RADIUS protocol module 50 of control unit 44B may process Access-Request message 200, authenticating user 34 based on the provided access credentials through interactions with database 18 via database protocol module 52 (504).

Assuming user 34 is successfully authenticated, RADIUS protocol module 50 of control unit 44B may retrieve the one or more services for which user 34 is to be provided (506). RADIUS protocol module 50 may generate Access-Accept message 202 to include the one or more services for which user 34 is to be provided. RADIUS protocol module 50 may also include a "Result" message attribute having a value of "Result-Request" to request a result from network access server 14 as to whether the one or more authorized services are presently provided for use by the endpoint device. RADIUS protocol module 50 of control unit 44B may then transmit Access-Accept message 202 to RADIUS protocol module 50 of control unit 44B via interface 46B.

In this respect, RADIUS protocol module 50 of control unit 44B may provide services to be provisioned for user 34 and request results of provisioning the services via the same Access-Accept message 202 (508, 510). Although described as occurring via the same message, RADIUS protocol module 50 may provide the services via a separate Access-Accept message from that used to request the results of the service.

RADIUS protocol module 50 of control unit 44A may receive Access-Accept message 202. RADIUS protocol module 50 may process Access-Accept message 202 to extract authorized services 220 and provide the one or more authorized services 220 to service provisioning module 54. Service provisioning module 54 may provision authorized services 220 and indicate to RADIUS protocol module 50 that the services have been provisioned (512).

RADIUS protocol module 50 may next, due to the result request specified in the Access-Accept message, query service provisioning module 54 as to the result of provisioning authorized services 220. Service provisioning module 54 may then reply by determine the result of provisioning each of the queried authorized services (i.e., authorized services 220 in this example) (514). Service provisioning module 54 may reply to the query with results 222. RADIUS protocol module 50 of control unit 44A may receive results 222 and generate a result message in the form of an Access-Request message 204 that includes a "Result" message attribute having a value of "Result-Success" or "Result-Failed" based on results 222. RADIUS protocol module 50 of control unit 44A transmits the Access-Request message 204 via interface 46A to RADIUS protocol module 50 of control unit 44B. In this way, network access server 14 may report the result of service provisioning (516).

RADIUS protocol module 50 of control unit 44B may receive Access-Request message 204 and process message 204 to identify whether all of services 220 were successfully provisioned or whether any one of services 220 were not successfully provisioned. RADIUS protocol module 50 of control unit 44B may operate in any of the above noted ways based on the identified whether all of services 220 were successfully provisioned or whether any one of services 220 were not successfully provisioned. RADIUS protocol module 50 may respond to Access-Request message 204 with a confirmation message in the form of an Access-Accept message 206 that includes a "Result" message attribute having a value of "Result-Received."

In this way, the techniques described in this disclosure may provide a generic solution for authentication and authorization server 16 to receive status from network access server 14 in a way that does not depend on any accounting messages. Moreover, the techniques accommodate both the push and pull mechanism through the conversion process described in RFC 7499. As a result, service providers do not need to change how to apply services to accommodate status checking given that the techniques described in this disclosure all for a way to convert from the push mechanism to the pull mechanism.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the devices described above may perform a method or otherwise comprise means to perform each step of the method for which each of the devices are configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which each of the devices has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

The invention claimed is:

1. A method of operating an authorization server in a network, the method comprising:
   transmitting, by the authorization server and in accordance with a network access protocol, an access message authorizing a network access server to allow an endpoint device to access one or more services identified by the access message,
   wherein the access message includes a request, by the authorization server, and in accordance with the network access protocol, for a result message from the network access server as to whether, after the network access server provisions the one or more authorized services for use by the endpoint device, the one or more authorized services are presently provided by the network access server for use by the endpoint device; and
   receiving the result message from the network access server in accordance with the network access protocol, the result message indicating whether each of the one or more authorized services are either presently provided for use by the endpoint device or not presently provided for use by the endpoint device.

2. The method of claim 1, further comprising sending a confirmation message to the network access server in accordance with the network access protocol, the confirmation message confirming receipt of the result message by the authorization server.

3. The method of claim 1, further comprising, when the result message indicates that at least one of the one or more authorized services is not provided for use by the endpoint device, de-authorizing the endpoint device for use of the at least one service of the authorized one or more services.

4. The method of claim 3, further comprising, when the result message indicates that at least one of the one or more authorized services is not provided for use by the endpoint device, alerting a network management device that the at least one of the one or more authorized services is not presently provided for use by the endpoint device.

5. The method of claim 1,
   wherein transmitting the access message comprises transmitting, in accordance with the network access protocol, an access accept message that authorizes the endpoint device to access the one or more services identified by the access accept message, and wherein receiving the result message comprises receiving an access request message indicating whether each of the one or more authorized services are either presently provided for use by the endpoint device or not presently provided for use by the endpoint device.

6. The method of claim 1, wherein transmitting the access message authorizing the network access server comprises:

transmitting, in accordance with the network access protocol, a change of authorization (CoA) request message that requests re-authorization of the one or more authorized services provided to the endpoint device;

receiving, in accordance with the network access protocol, an access request message requesting re-authorization for the endpoint device to access the one or more services; and transmitting, in accordance with the network access protocol, an access accept message that re-authorizes the endpoint device to access the one or more services.

7. The method of claim 1, further comprising:

sending a first packet of the plurality of access acceptance packets comprising a first fragment of the one or more services to the network access server;

responsive to sending the first packet of the plurality of access acceptance packets, receiving an access request message from the network access server for additional data; and responsive to the access request message for more data from the network access server, sending a second packet of the plurality of access acceptance packets to the network access server.

8. The method of claim 1, wherein the network access protocol comprises a Remote Authentication Dial In User Service (RADIUS) or diameter protocol.

9. The method of claim 1, wherein requesting the result message comprises transmitting a first message that includes a first message attribute with a value of Result-Request, wherein the method further comprises:

receiving, in response to the first message, a second message that includes the result message as a second message attribute with a value of one of Result-Success or Result-Failed; and transmitting, in response to the second message, a third message that includes a third message attribute with a value of Result-Received.

10. The method of claim 9, wherein the second message attribute has the value of Result-Failed and an Error-Cause attribute including a cause of Result-Failed attribute.

11. An authorization server comprising:

an interface configured to transmit, in accordance with a network access protocol, an access message authorizing a network access server to allow an endpoint device to access one or more services identified by the access message, and a control unit comprising a processor configured to generate the access massage to include a request, in accordance with a network access protocol, for a result message from the network access server as to whether, after the network access server provisions the one or more authorized services for use by the endpoint device, the one or more authorized services are presently provided by the network access server for use by the endpoint device, wherein the interface is also configured to receive the result message from the network access server in accordance with the network access protocol, the result message indicating whether each of the one or more authorized services are either presently provided for use by the endpoint device or not presently provided for use by the endpoint device.

12. The authorization server of claim 11, further comprising an interface configured to send a confirmation message to the network access server in accordance with the network access protocol, the confirmation message confirming receipt of the result message by the authorization server.

13. The authorization server of claim 11, wherein the control unit is further configured to, when the result message indicates that at least one of the one or more authorized services is not provided for use by the endpoint device, de-authorize the endpoint device for use of the at least one service of the authorized one or more services.

14. The authorization server of claim 13, wherein the control unit is further configured to, when the result message indicates that at least one of the one or more authorized services is not provided for use by the endpoint device, alert a network management device that the at least one of the one or more authorized services is not presently provided for use by the endpoint device.

15. The authorization server of claim 11, wherein the interface is configured to transmit, in accordance with the network access protocol, an access accept message that authorizes the endpoint device to access the one or more services, and wherein the interface is further configured to receive an access request message indicating whether each of the one or more authorized services are either presently provided for use by the endpoint device or not presently provided for use by the endpoint device.

16. The authorization server of claim 11, wherein the interface is configured to transmit, in accordance with the network access protocol, a change of authorization (CoA) request message that requests re-authorization of the one or more authorized services provided to the endpoint device, receive, in accordance with the network access protocol, an access request message requesting re-authorization for the endpoint device to access the one or more services, and transmit, in accordance with the network access protocol, an access accept message that re-authorizes the endpoint device to access the one or more services.

17. The authorization server of claim 11, wherein the interface is configured to transmit a first packet of the plurality of access acceptance packets comprising a first fragment of the one or more services to the network access server, responsive to transmitting the first packet of the plurality of access acceptance packets, receive an access request message from the network access server for additional data, and responsive to the access request message for more data from the network access server, transmit a second packet of the plurality of access acceptance packets to the network access server.

18. The authorization server of claim 11, wherein the network access protocol comprises a Remote Authentication Dial In User Service (RADIUS) or diameter protocol.

19. The authorization server of claim 11, further comprising an interface configured to transmit a first message that includes a first message attribute with a value of Result-Request, receive, in response to the first message, a second message that includes the result message as a second message attribute with a value of one of Result-Success or Result-Failed, and transmit, in response to the second message, a third message that includes a third message attribute with a value of Result-Received.

20. A network access server comprising:
an interface configured to receive, from an authorization server, an access message including authorization to allow an endpoint device to access one or more services in accordance with a network access protocol and a request, by the authorization server, and in accordance with the network access protocol, for a result message indicating whether the one or more authorized services are presently provided for use by the endpoint device; and
a control unit comprising a processor configured to:
provision, responsive to the access message, the one or more authorized services for use by the endpoint device;
determine a result of provisioning the one or more authorized services; and
generate, based on the determined result of provisioning the one or more authorized services, the result message indicating whether the one or more authorized services are presently provided for use by the endpoint device, and
wherein the interface is further configured to report, via the result message, the determined result to the authorization server in accordance with the network access protocol.

21. The network access server of claim 20,
wherein the control unit is configured to generate an Access-Request message that conforms to the network access protocol and that includes the determined result, and
wherein the interface is further configured to transmit the Access-Request message to the authorization server in accordance with the network access protocol.

22. The network access server of claim 21, wherein the Access-Accept message comprises a result attribute with the value Result-Success to indicate that all of the one or more authorized services have been successfully provisioned for use by the endpoint device.

23. The network access server of claim 21, wherein the Access-Accept message comprises a result attribute with the value Result-Failed to indicate that at least one of the one or more authorized services have not been successfully provisioned for use by the endpoint device.

24. The network access server of claim 21,
wherein the interface is further configured to receive, from the authorization server, a request for the result of provisioning the one or more authorized services in accordance with the network access protocol, and
wherein the control unit is configured to determine the result of provisioning each of the one or more authorized services responsive to receiving the request.

25. The network access server of claim 21, wherein the control unit is configured to determine the result of provisioning the one or more authorized services responsive to receiving authorization to provision the one or more authorized services.

26. A method of operating a network access server comprising:
receiving, from an authorization server, an access message including authorization to allow an endpoint device to access one or more services in accordance with a network access protocol and a request, by the authorization server, and in accordance with the network access protocol, for a result message indicating whether the one or more authorized services are presently provided for use by the endpoint device;
provision, responsive to the access message, the one or more authorized services for use by the endpoint device;
determining a result of provisioning the one or more authorized services;
generating, based on the determined result of provisioning the one or more authorized services, the result message indicating whether the one or more authorized services are presently provided for use by the endpoint device; and
reporting, via the result message, the determined result to the authorization server in accordance with the network access protocol following receiving the authorization to allow the endpoint device to access the one or more services.

27. The method of claim 26, further comprising generating an Access-Request message that conforms to the network access protocol and that includes the determined result,
wherein reporting the determined result comprises transmitting the Access-Request message to the authorization server in accordance with the network access protocol.

28. The method of claim 27, wherein the Access-Accept message comprises a result attribute with the value Result-Success to indicate that all of the one or more authorized services have been successfully provisioned for use by the endpoint device.

29. The method of claim 27, wherein the Access-Accept message comprises a result attribute with the value Result-Failed to indicate that at least one of the one or more authorized services have not been successfully provisioned for use by the endpoint device.

30. The method of claim 27,
wherein determining the result comprises determining the result of provisioning each of the one or more authorized services responsive to receiving the request.

31. The method of claim 27, wherein determining the result comprises determining the result of provisioning the one or more authorized services responsive to receiving authorization to provision the one or more authorized services.

* * * * *